United States Patent
Sweet et al.

(10) Patent No.: US 6,623,864 B1
(45) Date of Patent: Sep. 23, 2003

(54) SILICONE COMPOSITION USEFUL IN FLAME RETARDANT APPLICATIONS

(75) Inventors: Randall P. Sweet, Midland, MI (US); Jimmy H. Gallmeyer, Edmonton (CA)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/342,089

(22) Filed: Jan. 13, 2003

(51) Int. Cl.$^7$ ................................................. B32B 9/04
(52) U.S. Cl. ....................... 428/447; 523/218; 524/436; 524/493; 524/588; 525/479; 528/31; 528/32
(58) Field of Search .................. 524/436, 493, 524/588; 523/218; 525/479; 528/32, 31; 428/447

(56) References Cited

U.S. PATENT DOCUMENTS

| | | |
|---|---|---|
| 2,676,182 A | 4/1954 | Daudt et al |
| 3,884,866 A * | 5/1975 | Jeram et al. |
| 4,269,753 A | 5/1981 | Mine et al. |
| 4,269,757 A | 5/1981 | Mine et al. |
| 4,286,013 A | 8/1981 | Daroga et al. |
| 5,082,886 A * | 1/1992 | Jeram et al. ................ 524/403 |
| 5,861,451 A | 1/1999 | Schroeder et al. |
| 5,989,719 A | 11/1999 | Loiselle |
| 6,274,648 B1 * | 8/2001 | Meguriya et al. ........... 523/218 |

OTHER PUBLICATIONS

Abstract German 89223636 May 26, 1994.

* cited by examiner

Primary Examiner—Margaret G. Moore
(74) Attorney, Agent, or Firm—Robert L. McKellar

(57) ABSTRACT

Organopolysiloxane-based compositions that are used to prepare silicone rubbers that are flame retardant and to the use of such rubbers. More specifically, flame retardant rubbers that are useful as coatings, for example, as marine deck coatings, firewall construction and fireblanket applications. The materials are resin reinforced silicone polymers used in conjunction with ceramic hollow spheres and they have demonstrated good performance in flame retardancy tests.

22 Claims, No Drawings

SILICONE COMPOSITION USEFUL IN FLAME RETARDANT APPLICATIONS

BACKGROUND OF THE INVENTION

This invention deals with organopolysiloxane-based compositions that are used to prepare silicone rubbers that are flame retardant and to the use of such rubbers. More specifically, this invention deals with flame retardant rubbers that are useful as coatings, for example, as marine deck coatings, firewall construction and fireblanket applications. The materials of this invention are resin reinforced silicone polymers used in conjunction with ceramic hollow spheres and they have demonstrated good performance in burn tests.

The rubbers are prepared by curing a composition comprising liquid dimethylvinyl end blocked polydimethylsiloxane polymers, organopolysiloxane resins, hollow ceramic spheres having a specific particle size, fillers, and a crosslinker in the form of a liquid organohydrogensiloxane in the presence of a catalyst for the crosslinking reaction. Prior to the cure, these materials have the attribute of being liquid silicone rubbers that are easily pourable and castable which allows the materials to be self-leveling. Optionally, adhesion promoters can be added prior to curing to permit adhesion to a desired substrate.

PRIOR ART

One patent, U.S. Pat. No. 4,269,753 that issued to Mine, et al on Sep. 18, 1980 deals with a fire resistant coating comprised of a mixture of siloxanes containing vinyl groups, siloxanes containing SiH groups, ceramic forming fillers, such as ZnO, Al2O3 or mica and a platinum catalyst. Hollow spheres as part of the composition are not disclosed nor suggested. Also, this composition does not deal with resin reinforcement.

Mine, et al also have issued a patent, U.S. Pat. No. 4,396,757, that issued on Sep. 18, 1980 that deals with fire resistant coating compositions comprising vinyl containing siloxane polymers, ceramic forming fillers, and an organoperoxide as a curing agent. This material does not cure via platinum catalyzed silicon hydride addition to unsaturated compounds, does not deal with resin reinforcement, and does not deal with hollow glass spheres in the composition.

U.S. Pat. No. 4,286,013 issued to Daroga, et al, on Aug. 25, 1981 deals with a flame barrier sheet that is comprised of curable diorganopolysiloxane gum coatings containing hollow glass microspheres.

In Great Britain patent GB9223636 to Hluchan, et al, there is disclosed a sealant composition that is comprised of a silicone resin, a filler, a ceramic fire retardant, a smoke suppressant and an intumescent compound. This material is used to seal penetrations and opening in walls, floors and ceilings, such as around pipes and the like. Upon exposure to heat, the intumescent compound converts the material to a sealing compound.

U.S. Pat. No. 5,861,451, that issued to Schroeder, et al on May 6, 1998 deals with an aqueous silicone emulsion that forms an elastomer upon dehydration that is composed of diorgansiloxane polymer, a crosslinker comprised of a linear aminoxy-functional siloxane, a cyclic aminoxy-functional siloxane, water, surfactants, aluminum trihydrate, fumed titanium dioxide, zinc borate, magnesium oxide or a ceramic filler that is used to seal openings in structural building components to reduce the amount of smoke that may pass through the opening.

None of the prior art discussed supra deals with a resin reinforced, liquid silicon material that contains hollow ceramic spheres that is useful for flame retardancy.

THE INVENTION

This invention deals with a silicone composition that is useful for curing into a silicone rubber flame retardant material. With more specificity the invention comprises a silicone composition comprising (A) 0.50 to 4.50 weight percent of a liquid dimethyl vinyl end blocked polydimethylsiloxane polymer having an average molecular weight in the range of 9300 to 12,600 and a vinyl group content in the range of 0.35 to 0.60 weight percent. The component (B) is 2.00 to 10.00 weight percent of a blend of from 55:45 to 65:35 of a liquid dimethylvinyl end blocked polydimethylsiloxane polymer having an average molecular weight in the range of 27,000 to 36,800 and having a vinyl group content in the range of 0.18 to 0.25 weight percent and, an organopolysiloxane resin consisting essentially of (i) $R^1_2(CH_2=CH)SiO_{0.5}$ units; (ii) $R^2_3SiO_{0.5}$ units and (iii) $SiO_{4/2}$ units, wherein the molar ratio of the combination of (i) and (ii) units to (iii) units is from 0.6 to 1.1, and the concentration of (i) units is from 0.2 to 8 weight percent based on the weight of said organopolysiloxane resin, and $R^1$ and $R^2$ are each selected from the group consisting of alkyl groups containing from 1 to 4 carbon atoms and phenyl, with the proviso that at least 95 percent of the $R^1$ and $R^2$ groups are methyl groups and the total mixture has a weight percent vinyl content in the range of from 0.40 to 0.60. Component (C) is about 14.00 to 55.00 weight percent of a blend of from 60:40 to 70:30 of a liquid dimethylvinyl end blocked polydimethylsiloxane polymer having an average molecular weight in the range of 48,000 to 65,000 and having a vinyl group content in the range of 0.075 to 0.10 weight percent and, an organopolysiloxane resin consisting essentially of (i) $R^1_2(CH_2=CH)SiO_{0.5}$ units, (ii) $R^2_3SiO_{0.5}$ units and (iii) $SiO_{4/2}$ units wherein the molar ratio of the combination of (i) and (ii) units to (iii) units is from 0.6 to 1.1, and the concentration of (i) units is from 0.2 to 8 weight percent based on the weight of said organopolysiloxane resin, and $R^1$ and $R^2$ are each selected from the group consisting of alkyl groups containing from 1 to 4 carbon atoms and phenyl, with the proviso that at least 95 percent of the $R^1$ and $R^2$ groups are methyl groups and the total mixture has a weight percent vinyl content in the range of from 0.40 to 0.60;

Component (D) is 0 to 0.45 weight percent of a silanol endblocked methylvinyl/dimethyl polysiloxane copolymer containing in the range of 8.0 to 14.0 weight percent vinyl groups, while component (E) is 1.00 to 4.00 weight percent of a crosslinker in the form of a liquid organohydrogensiloxane in an amount sufficient to provide from 1 to 3 silicon-bonded hydrogen atoms per vinyl group present in components (A), (B), (C), and (D) combined, said organohydrogensiloxane having an average of at least three silicon-bonded hydrogen atoms per molecule and consisting essentially of units selected from the group consisting of methylhydrogensiloxy, dimethylsiloxy, dimethylhydrogensiloxy, trimethylsiloxy and $SiO_{4/2}$ units;

Component (F) is from 1.50 to 35.0 weight percent of hollow ceramic spheres having a mean particle size of 5 to $500\mu$ and a bulk density in the range of 0.35 g/cm$^3$ to 0.45 g/cm$^3$.

Component (G) is comprised of about 8.0 to 30.00 weight percent of a filler having at least 90% of the particles with an average mesh size of 270 or greater selected from the group consisting of quartz and magnesium oxide.

Finally, component (H) is 0.05 to 0.40 weight percent of a catalyst.

The weight percent of components (A), (B), (C), (D), (E), (F), (G), and (H) are based on the total weight of components (A), (B), (C), (D), (E), (F), (G), and (H) in the composition.

Turning now to the specifics of the components, the vinyl end blocked polydimethylsiloxanes of this invention are well known materials to those skilled in the art. They are commercially available in a wide range of molecular weights and vinyl content. The viscosities of these materials range from about 100 cps to about 75,000 cps, measured at a temperature of 25° C. and they can be represented by the formula

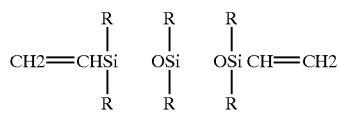

wherein R is methyl or phenyl and at least 95% of the R groups are methyl. Preferably, 100% of the R groups are methyl.

Of this category of components, component (A) is used in the range of 0.5 to about 4.5 weight percent, it being noted that all percentages of components are based on the total weight of the components (A) to (H) in the composition. A preferred range for this component is a range of about 0.9 to about 4.0 weight percent. The materials that are useful in this invention have an average molecular weight in the range of 9300 to 12,600 and most preferred is a molecular weight in the range of 9800 to about 11,500. The amount of vinyl groups in this component is in the range of 0.35 to about 0.60 and preferred for this material is a vinyl content in the range of about 4 to about 5 weight percent.

A second component in this category is component (B) wherein component (B) is used at a weight percent of 2.0 to 10.00. The non-resinous components of this component have an average molecular weight in the range of 27,000 to 36,800 and they have a vinyl group content in the range of 0.18 to about 0.25 weight percent with the preferred range being from about 0.2 to about 0.22 weight percent.

Component (C) of this invention is a blend of a vinyl-containing polydimethyl siloxane and a vinylated resinous polymer. The blend can range from 60:40 to 70:30; the preferred blend range being from 62:38 to 65:35 and the most preferred blend is 67:33.

The vinyl-containing polydimethylsiloxane is a liquid and is dimethylvinyl endblocked. They have an average molecular weight in the range of 48,000 to 65,000, the preferred range is from 52,000 to about 58,000, and the most preferred range is from about 54,000 to about 57,000. The viscosity of the polymer ranges from about 35,000 to about 45,000. The vinyl content ranges from about 0.05 to about 1.5 weight percent, and preferred for this invention is a range of about 0.9 to about 1.2 weight percent vinyl.

The resinous component is one in which there are present $R^1_2(CH_2=CH)SiO_{0.5}$ units, $R^2_3SiO_{0.5}$ units and $SiO_{4/2}$ units. The molar ratio of the combination of the $R^1_2(CH_2=CH)SiO_{0.5}$ units and the $R^2_3SiO_{0.5}$ units to the $SiO_{4/2}$ units is from 0.6 to 1.1, and the concentration of the $R^1_2(CH_2=CH)SiO_{0.5}$ units is from 0.2 to 8 weight percent based on the weight of said organopolysiloxane resin. Each $R^1$ and $R^2$ are selected from the group consisting of alkyl groups containing from 1 to 4 carbon atoms and phenyl, with the proviso that at least 95 percent of the $R^1$ and $R^2$ groups are methyl groups and the total mixture has a weight percent vinyl content in the range of from 0.40 to 0.60.

Resinous copolymers containing the aforementioned units can be prepared as described in U.S. Pat. No. 2,676,182, issued to Daudt and Tyler, which is hereby incorporated by reference in its entirety for what it teaches about such resins and their preparation.

Component (D) is 0 to 0.45 weight percent of a silanols endblocked methylvinyl/dimethyl polysiloxane copolymer containing in the range of 8.0 to 14.0 weight percent vinyl groups. Preferred for this invention is a weight percent vinyl of about 10% to about 12%. It is also preferred that this component be silanols endblocked with only one silanols on each end a molecule, that is, a diol endblocked siloxane polymer. It is also preferred within the scope of this invention to use a component (D) at about the 0.5 to about 0.35 weight percent range.

Component (E) of this invention is a crosslinker for the vinyl containing materials and is used in the form of a liquid organohydrogensiloxane in an amount of about 1.00 to about 4.00 weight percent. Enough is needed in the composition to provide from 1 to 3 silicon-bonded hydrogen atoms per vinyl group present in components (A), (B), (C), and (D) combined. This material can also have a small amount of units selected from the groups consisting of methylhydrogensiloxy, dimethylsiloxy, dimethylhydrogensiloxy, trimethylsiloxy and $SiO_{4/2}$ units. The amount of material that is used needs to provide an SiH/Vinyl ratio of from about 1.60 to 6.0. Such materials can also be in the form of organohydrogensiloxane cyclics such as methylhydrogen cyclic trimer, tetramer, pentamer and mixtures of such cyclics. The materials of this component can also be organohydrogensiloxane resinous materials that are known in the art. These materials can be used a long as the SiH/Vinyl ratios are met. Such materials can be found, for example, in U.S. Pat. No. 5,989,719 that issued to Loiselle on Nov. 23, 1999 and are shown as component (C) therein, all of which is incorporated herein by reference to show the materials and describe their preparation.

Component (F) is the hollow ceramic spheres useful in this invention. These materials have a mean particle size of 80 to 160 microns and a bulk density in the range of 0.35 g/cm$^3$ to 0.45 g/cm$^3$. The hollow spheres preferred herein are standard grade, 5 to 500 micron particle size with a mean particle size of 120 microns. Bulk density is preferred at 0.40 g/cm$^3$ and these materials have a composition by weight percent of silica as $SiO_2$ at 58 to 65, alumina as $Al_2O_3$ at 28 to 33 and iron oxides as $Fe_2O_3$ at less than 1%.

Component (G) is filler having at least 90% of the particles with an average mesh size of 150 or greater selected from a group consisting of quartz and magnesium oxide.

Component (H) is a catalyst. The catalysts useful herein are any of those known to catalyze the reaction between silicon bonded hydrogen atoms and olefinic double bonds, such as are present in silicon bonded vinyl groups. Preferred for this invention are platinum catalysts. A particularly suitable class of platinum-containing catalyst is a complex prepared from chloroplatinic acid and certain unsaturated organosilicon compounds and described by Willing in U.S. Pat. No. 3,419,593 that is hereby incorporated by reference to show these complexes and their preparation. One preferred catalyst of this type is a reaction product of chloroplatinic acid and sym-divinyltetra methyldisiloxane.

Optionally, short fibers can be added to the inventive composition, by that what is meant is fibers having on the order of about ⅜ inch in length or less, and most preferably, ¼ or less. Such fibers can be for example carbon fibers, glass fibers, elastonite fibers, and the like.

Also, it should be noted that adhesion promoters can be added to the inventive compositions in order to enhance their adhesion to various substrates. Most useful are tetraalkoxy silanes, alkyltrimethoxy silanes and organofunctional silanes, and the preferred materials are organofunctional silanes for this purpose. It should be noted that mixtures of the organofunctional silanes and the tetra and alkyltrimethoxy silanes can be used. Commonly used are alkyltrialkoxysilanes that have from 1 to 4 carbon atoms. The adhesion promoters are used herein at the 5 weight percent to 25 weight percent level based on the curing agent that is used, that is, the amount of catalyst that is used. Preferred is an amount of about 14 to 23 weight percent and most preferred is about 15 to about 18 weight percent.

The order of mixing of the components is not critical, it being noted that when the components are all mixed together, the curing reaction starts and thus, one must be ready to apply the composition prior to curing. Because the cure reaction is normally slow at room temperature, the components can be used over a period of time. After application, heat can be applied to enhance the rate of cure.

Optional fillers can be used in the compositions of this invention. One such filler is $CaCO_3$. $CaCO_3$ helps promote adhesion when used with alkoxy silanes as the adhesion promoter, and this is most useful at room temp when using alkoxy silanes.

What follows are examples of formulated materials that fall within the scope of this invention. The ceramic hollow spheres, used in the following examples, were obtained from the PQ Corporation, Pittsburgh, Pa. The ground silica was Sil 325 obtained from Sil Silica Inc, Edmonton, Alberta, Canada, having the following composition expressed in typical mean % cumulative retained on a mesh (ASTM E-11): 0.2 at 140 mesh, 1.4 at 200 mesh, 4.1 at 270 mesh, 4.8 at 325 mesh, and 89.3 at greater than 325 mesh. The hollow spheres were standard grade, 5 to 500 micron in particle size with a mean particle size of 120 microns. Bulk density is 0.40 g/cm$^3$ and it has a composition by weight percent of silica as $SiO_2$ at 58 to 65, alumina as $Al_2O_3$ at 28 to 33 and iron oxides as $Fe_2O_3$ at less than 1%.

The flame retardancy test was carried out using a hand held propane torch unless the example directs otherwise.

The samples were each coated onto a steel panel at approximately 1 mm in thickness and the panel was set vertically for the test. The actively flaming torch was moved up to its highest flame setting without extinguishing the flame, and then moved up close to the coating, but not so closed that the flame was extinguished during the test. The flame was directed at the coating for a total of three minutes and then removed. The observations were taken immediately after the flame was removed.

EXAMPLE 1

The following were combined and mixed. All are expressed in weight percent. Ground quartz 16.05%; ceramic microspheres 17.65%; $TiO_2$ 3.75%: 46.43% of a blend of 67.4 parts of a dimethylvinyl end blocked polydimethylsiloxane having a viscosity of about 40,000 cps, a molecular weight of about 56,600 and 0.09 weight % vinyl content, and 32.6 parts of a vinyl-containing methylpolysiloxane resin having a vinyl content of about 1.80 weight percent, wherein the resin/polymer mixture have a total vinyl content of about 0.55 weight % and a viscosity of about 50,000 cps; 8.40% of a blend of a dimethylvinyl end blocked polydimethylsiloxane polymer having an approximate viscosity of 2000 cps and a vinyl group content of about 0.21 weight %, and a methyl polysiloxane resin containing 1.80 weight percent vinyl groups wherein the ratio of the blend is about 63/37; 3.60% of a dimethylvinyl end blocked polydimethylsiloxane polymer of about 400 cps viscosity and having 0.5 weight % vinyl content and a molecular weight of approximately 11,000; 0.34% of a methyl vinyl containing polydimethylsiloxane copolymer diol (silanol end blocked), short chain polymer that contains about 12 weight percent vinyl group content; 0.30 % of a platinum catalyst wherein the platinum content in the total composition is about 15 ppm; 3.48% of a silicone hydride copolymer consisting of the average structure of $(CH_3)_3(CH_3HSiO)_5\{(CH_3)_2SiO\}_3Si(CH_3)_3$. This material cured into a soft solid material at room temperature.

EXAMPLE 2

The following were combined and mixed. All are expressed in weight percent. Ground quartz 12.32%; ceramic microspheres 13.55%; calcium carbonate 20.93%, obtained from Imerys Marble, Inc. Roswell, Ga., USA, sold as Gama-Sperse CS-11, stearate treated; $TiO_2$ 2.87%; 35.62% of a blend of 67.4 parts of a dimethylvinyl end blocked polydimethylsiloxane having a viscosity of about 40,000 cps, a molecular weight of about 56,600 and 0.09 weight % vinyl content, and 32.6 parts of a vinyl-containing methylpolysiloxane resin having a vinyl content of about 1.80 weight percent, wherein the resin/polymer mixture has a total vinyl content of about 0.55 weight % and a viscosity of about 50,000 cps; 6.45% of a blend of a dimethylvinyl end blocked polydimethylsiloxane polymer having an approximate viscosity of 2000 cps and a vinyl group content of about 0.21 weight %, and a methyl polysiloxane resin containing 1.80 weight percent vinyl groups wherein the ratio of the blend is about 63/37; 1.84% of a dimethylvinyl end blocked polydimethylsiloxane polymer of about 400 cps viscosity and having 0.5 weight % vinyl content and a molecular weight of approximately 11,000; 2.78% of a dimethylvinyl end blocked polydimethylsiloxane polymer of about 400 cps viscosity and a molecular weight of approximately 11,000; 2.09% of an adhesion promoter that is an alkoxy silane that is based upon a reaction product of ethylene glycol and tetraethylorthosilicate to give $(CH_3CH_2O)_3SiOCH_2CH_2OSi(OCH_2CH_3)_3$; 0.21% TBT titanium obtained from Fisher Scientific, (Pittsburgh Pa); 0.27% of a methyl vinyl containing polydimethylsiloxane copolymer diol (silanol end blocked), short chain polymer that contains about 12 weight percent vinyl group content; 0.24 platinum catalyst to provide 12.0 ppm platinum, and 2.67% of a silicone hydride copolymer consisting of the average structure of $(CH_3)_3(CH_3HSiO)_5\{(CH_3)_2SiO\}_3Si(CH_3)_3$. This material cured to a soft solid at room temperature.

EXAMPLE 3

The following were combined and mixed to provide an SiH/Vi ratio of 0.76 to 1.0. All are expressed in weight percent. About 21.38% of $CaCO_3$; 2.94% $TiO_{2\%}$; 12.58 ground quartz filler; 1.65 of adhesion promoter found in Example 2; 13.83 ceramic microspheres equivalent to those used in Example 2; 0.24% platinum catalyst to provide 12.0 ppm platinum; 6.59% of a blend of a dimethylvinyl end blocked polydimethylsiloxane polymer having an approximate viscosity of 2000 cps and a vinyl group content of about 0.21 weight %, and a methyl polysiloxane resin containing 1.80 weight percent vinyl groups wherein the ratio of the blend is about 63/37; 2.82% a dimethylvinyl end blocked polydimethylsiloxane polymer of approximate viscosity 400 cps, a molecular weight of approximately 11,000, and a vinyl group content of about 0.5 weight percent; 36.41% of a blend of 67.4 parts of a dimethylvinyl end blocked polydimethylsiloxane having a viscosity of about 40,000 cps, a molecular weight of about 56,600 and 0.09 weight % vinyl content, and 32.6 parts of a vinyl-containing methylpolysiloxane resin having a vinyl content of about 1.80 weight percent, wherein the resin/polymer mixture has a total vinyl content of about 0.55 weight % and a viscosity of about 50,000 cps; 0.26% methyl vinyl polydimethylsiloxane copolymer diol (silanol end blocked) short chain polymer that contains about 12 Weight percent vinyl; 0.21% Titanium (IV) n-butoxide obtained from Fisher Scientific; 1.08% of a silicone hydride copolymer consisting of the average structure $(CH_3)_3(CH_3HSiO)_5\{(CH_3)_2SiO\}_3Si(CH_3)_3$.

This material cured into a soft solid at room temperature.

EXAMPLE 4

The components set forth in example 3 were combined in an additional formulation of the following to provide an SiH/Vi ratio of 1.91 to 1.0.

| | | |
|---|---|---|
| | $CaCO_3$ | 20.93% |
| | $TiO_2$ | 2.87% |
| | Ceramic Microspheres | 13.55% |
| | Ground Quartz filler | 12.32% |
| | Organofunctional silane Adhesion promoter | 2.10% |
| | Platinum catalyst | 0.24% |
| | Diol polymer | 0.25% |
| | 63/37 polymer/resin blend | 6.45% |
| | 400 cps vinyl polymer | 2.76% |
| | 67.4/32.6 polymer/resin blend | 35.65% |
| | Titanium butoxide | 0.21% |
| | Silicone crosslinker | 2.67% |

This material cured into a soft solid material at room temperature.

EXAMPLE 5

The components set forth in this example were combined and cured as a coating on a steel panel or tested as a free standing slab and then subjected to the flame retardancy test set forth Supra.

The description of the components is set forth above in the examples 1 to 4.

The following samples were prepared:

| | | |
|---|---|---|
| A | $TiO_2$ | 3.75% |
| | Ceramic Microspheres | 17.65% |
| | Ground Quartz filler | 16.05% |
| | Platinum catalyst | 0.30% |
| | Diol polymer | 0.34% |
| | 63/37 polymer/resin blend | 8.40% |
| | 400 cps vinyl polymer | 3.60% |
| | 67.4/32.6 polymer/resin blend | 46.43% |
| | Silicone cross linker | 3.48% |
| B | $CaCO_3$ | 20.93% |
| | $TiO_2$ | 2.87% |
| | Ceramic Microspheres | 13.55% |
| | Ground Quartz filler | 12.32% |
| | Adhesion promoter | 2.10% |
| | Platinum catalyst | 0.24% |
| | Diol polymer | 0.25% |
| | 63/37 polymer/resin blend | 6.45% |
| | 400 cps vinyl polymer | 2.76% |

-continued

| | | |
|---|---|---|
| | 67.4/32.6 polymer/resin blend | 35.65% |
| | Titanium butoxide | 0.21% |
| | Silicone cross linker | 2.67% |
| C | $CaCO_3$ | 20.79% |
| | $TiO_2$ | 2.85% |
| | Ceramic Microspheres | 13.45% |
| | Ground Quartz filler | 12.23% |
| | Methyl trimethoxy silane | 1.73% |
| | Platinum catalyst | 0.23% |
| | Diol polymer | 0.26% |
| | 63/37 polymer/resin blend | 6.40% |
| | 400 cps vinyl polymer | 2.75% |
| | 67.4/32.6 polymer/resin blend | 35.40% |
| | Titanium butoxide | 1.26% |
| | Silicone cross linker | 2.65% |
| D | $TiO_2$ | 3.75% |
| | Ceramic Microspheres | 17.65% |
| | Ground Quartz filler | 16.05% |
| | Platinum catalyst | 0.30% |
| | Diol polymer | 0.34% |
| | 63/37 polymer/resin blend | 8.40% |
| | 400 cps vinyl polymer | 3.60% |
| | 67.4/32.6 polymer/resin blend | 46.43% |
| | Silicone cross linker | 3.48% |
| E | 67.4/32.6 polymer/resin blend | 51.27% |
| | 63/37 polymer/resin blend | 9.40% |
| | 400 cps vinyl polymer | 4.03% |
| | Diol polymer | 0.38% |
| | Platinum catalyst | 0.34% |
| | Ground Quartz filler | 20.33% |
| | Ceramic Microspheres | 8.98% |
| | Iron Oxide | 1.79% |
| | Silicone cross linker | 3.48% |

Before testing, samples A, B, and C were cured onto a steel panel with the application of heat. Sample D was cured into a slab with heat, without any steel backing. Samples E was cured into a slab. Sample E was coated on woven fiberglass, on both sides, for a total coat weight of 10 ounces/square yard and cured for 5 minutes at 100° C. Sample E was burn tested by subjecting it to an acetylene torch direct flame contact at about 700° C. for 15 minutes.

Sample A showed very low smoke generation, the coating did not detach from the panel, and there was no flame or support for flame upon the removal of the flame source.

Sample B exhibited a very low smoke generation, no detachment from the steel panel, and there was no flame, or flame support when the flame source was removed from the sample.

Sample C exhibited very low smoke generation, did not detach from the steel panel and did not have any flame or flame support when the flame source was removed.

Sample D exhibited very low smoke generation and did not have any flame or flame support when the flame source was removed from the sample.

Sample E did not have any flame spread, low smoke generation and the flame did not have any flame support when the flame source was removed. No char was observed.

What is claimed is:

1. A silicone composition comprising:

(A) 0.50 to 4.50 weight percent of a liquid dimethylvinyl end blocked polydimethylsiloxane polymer having an average molecular weight in the range of 9300 to 12,600 and a vinyl group content in the range of 0.35 to 0.60 weight percent;

(B) 2.00 to 10.00 weight percent of a blend of from 55:45 to 65:35 of a liquid dimethylvinyl end blocked polydimethylsiloxane polymer having an average molecular weight in the range of 27,000 to 36,800 and having a vinyl group content in the range of 0.18 to 0.25 weight percent and, an organopolysiloxane resin consisting essentially of
- (i) $R^1{}_2(CH_2=CH)SiO_{0.5}$ units
- (ii) $R^2{}_3SiO_{0.5}$ units and
- (iii) $SiO_{4/2}$ units wherein the molar ratio of the combination of (i) and (ii) units to (iii) units is from 0.6 to 1.1, and the concentration of (i) units is from 0.2 to 8 weight percent based on the weight of said organopolysiloxane resin, and $R^1$ and $R^2$ are each selected from the group consisting of alkyl groups containing from 1 to 4 carbon atoms and phenyl, with the proviso that at least 95 percent of the $R^1$ and $R^2$ groups are methyl groups and the total mixture has a weight percent vinyl content in the range of from 0.40 to 0.60;

(C) 14.00 to 55.00 weight percent of a blend of from 60:40 to 70:30 of a liquid dimethylvinyl end blocked polydimethylsiloxane polymer having an average molecular weight in the range of 48,000 to 65,000 and having a vinyl group content in the range of 0.075 to 0.10 weight percent and, an organopolysiloxane resin consisting essentially of
- (i) $R^1{}_2(CH_2=CH)SiO_{0.5}$ units
- (ii) $R^2{}_3SiO_{0.5}$ units and
- (iii) $SiO_{4/2}$ units wherein the molar ratio of the combination of (i) and (ii) units to (iii) units is from 0.6 to 1.1, and the concentration of (i) units is from 0.2 to 8 weight percent based on the weight of said organopolysiloxane resin, and $R^1$ and $R^2$ are each selected from the group consisting of alkyl groups containing from 1 to 4 carbon atoms and phenyl, with the proviso that at least 95 percent of the $R^1$ and $R^2$ groups are methyl groups and the total mixture has a weight percent vinyl content in the range of from 0.40 to 0.60;

(D) 0 to 0.45 weight percent of a silanol endblocked methylvinyl/dimethyl polysiloxane copolymer containing in the range of 8.0 to 14.0 weight percent vinyl groups;

(E) 1.00 to 4.00 weight percent of a crosslinker in the form of a liquid organohydrogensiloxane in an amount sufficient to provide from 1 to 3 silicon-bonded hydrogen atoms per vinyl group present in components (A), (B), (C), and (D) combined, said organohydrogensiloxane having an average of at least three silicon-bonded hydrogen atoms per molecule and consisting essentially of units selected from the group consisting of methylhydrogensiloxy, dimethylsiloxy, dimethylhydrogensiloxy, trimethylsiloxy and $SiO_{4/2}$ units;

(F) 1.50 to 35.0 weight percent of hollow ceramic spheres having a mean particle size of 5 to $500\mu$ and a bulk density in the range of 0.35 g/cm³ to 0.45 g/cm³;

(G) 8.0 to 30.00 weight percent of a filler having at least 90% of the particles with an average mesh size of 270 or greater selected from the group consisting of
- (i) quartz and
- (ii) magnesium oxide;

(H) 0.05 to 0.40 weight percent of a catalyst, wherein the weight percent of components (A), (B), (C), (D), (E), (F), (G), and (H) are based on the total weight of components (A), (B), (C), (D), (E), (F), (G), and (H) in the composition.

2. A composition as claimed in claim 1 wherein the catalyst is a platinum catalyst for curing the composition.

3. A composition as claimed in claim 2 wherein there is additionally present titanium dioxide.

4. A composition as claimed in claim 3 wherein the silanols endblocked methylvinyl/polydimethylsiloxane copolymer is present in the range of 0.09 to 0.35 weight percent.

5. A composition as claimed in claim 4 wherein there is additionally present $CaCO_3$.

6. A composition as claimed in claim 4 wherein there is additionally present magnesium oxide.

7. A composition as claimed in claim 5 wherein there is additionally present an adhesion promoter.

8. A composition as claimed in claim 6 wherein there is additionally present an adhesion promoter.

9. A composition as claimed in claim 7 wherein there is additionally present a titanate catalyst.

10. A composition as claimed in claim 8 wherein there is additionally present a titanate catalyst.

11. A composition as claimed in claim 7 wherein the adhesion promoter is an organofunctional silane.

12. A composition as claimed in claim 11 wherein the silane is gamma-glycidoxypropyl trimethoxysilane.

13. A composition as claimed in claim 7 wherein the adhesion promoter is an alkyltrialkoxy silane.

14. A composition as claimed in claim 13 wherein the alkyltrialkoxy silane is methyl trimethoxy silane.

15. A composition as claimed in claim 7 wherein the adhesion promoter is a combination of methyltrimethoxy silane and an organofunctional silane.

16. A composition of claim 1 when cured on a solid substrate.

17. A composition of claim 1 when cured as a coating on a solid substrate.

18. A solid substrate having a cured coating thereon wherein a liquid coating material is used that comprises the incipient components:

(A) 0.50 to 4.50 weight percent of a liquid dimethylvinyl end blocked polydimethylsiloxane polymer having an average molecular weight in the range of 9300 to 12,600 and a vinyl group content in the range of 0.35 to 0.60 weight percent;

(B) 2.00 to 10.00 weight percent of a blend of from 55:45 to 65:35 of a liquid dimethylvinyl end blocked polydimethylsiloxane polymer having an average molecular weight in the range of 27,000 to 36,800 and having a vinyl group content in the range of 0.18 to 0.25 weight percent and, an organopolysiloxane resin consisting essentially of
- (i) $R^1{}_2(CH_2=CH)SiO_{0.5}$ units
- (ii) $R^2{}_3SiO_{0.5}$ units and
- (iii) $SiO_{4/2}$ units wherein the molar ratio of the combination of (i) and (ii) units to (iii) units is from 0.6 to 1.1, and the concentration of (i) units is from 0.2 to 8 weight percent based on the weight of said organopolysiloxane resin, and $R^1$ and $R^2$ are each selected from the group consisting of alkyl groups containing from 1 to 4 carbon atoms and phenyl, with the proviso that at least 95 percent of the $R^1$ and $R^2$ groups are methyl groups and the total mixture has a weight percent vinyl content in the range of from 0.40 to 0.60;

(C) 14.00 to 55.00 weight percent of a blend of from 60:40 to 70:30 of a liquid dimethylvinyl end blocked polydimethylsiloxane polymer having an average molecular weight in the range of 48,000 to 65,000 and having a vinyl group content in the range of 0.075 to 0.10 weight percent and, an organopolysiloxane resin consisting essentially of (i) $R^1_2(CH_2=CH)SiO_{0.5}$ units
(ii) $R^2_3SiO_{0.5}$ units and
(iii) $SiO_{4/2}$ units wherein the molar ratio of the combination of (i) and (ii) units to (iii) units is from 0.6 to 1.1, and the concentration of (i) units is from 0.2 to 8 weight percent based on the weight of said organopolysiloxane resin, and $R^1$ and $R^2$ are each selected from the group consisting of alkyl groups containing from 1 to 4 carbon atoms and phenyl, with the proviso that at least 95 percent of the $R^1$ and $R^2$ groups are methyl groups and the total mixture has a weight percent vinyl content in the range of from 0.40 to 0.60;

(D) 0 to 0.45 weight percent of a silanol endblocked methylvinyl/dimethyl polysiloxane copolymer containing in the range of 8.0 to 14.0 weight percent vinyl groups;

(E) 1.00 to 4.00 weight percent of a crosslinker in the form of a liquid organohydrogensiloxane in an amount sufficient to provide from 1 to 3 silicon-bonded hydrogen atoms per vinyl group present in components (A), (B), (C), and (D) combined, said organohydrogensiloxane having an average of at least three silicon-bonded hydrogen atoms per molecule and consisting essentially of units selected from the group consisting of methylhydrogensiloxy, dimethylsiloxy, dimethylhydrogensiloxy, trimethylsiloxy and $SiO_{4/2}$ units;

(F) 1.50 to 35.0 weight percent of hollow ceramic spheres having a mean particle size of 5 to 500μ and a bulk density in the range of 0.35 g/cm$^3$ to 0.45 g/cm$^3$;

(G) 8.0 to 30.00 weight percent of a filler having at least 90% of the particles with an average mesh size of 270 or greater selected from the group consisting of (i) quartz and (ii) magnesium oxide;

(H) 0.05 to 0.40 weight percent of a catalyst, wherein the weight percent of components (A), (B), (C), (D), (E), (F), (G), and (H) are based on the total weight of components (A), (B), (C), (D), (E), (F), (G), and (H) in the composition.

19. A solid substrate as claimed in claim 18 that is a marine deck.

20. A solid substrate as claimed in claim 18 that is a firewall construction.

21. A solid substrate as claimed in claim 18 that is woven fiberglass.

22. A composition as claimed in claim 1 wherein there is present from 0.1 to 0.45 weight percent.

* * * * *